US008924030B2

(12) United States Patent
Wendte et al.

(10) Patent No.: US 8,924,030 B2
(45) Date of Patent: *Dec. 30, 2014

(54) METHOD AND APPARATUS FOR OPTIMIZATION OF AGRICULTURAL FIELD OPERATIONS USING WEATHER, PRODUCT AND ENVIRONMENTAL INFORMATION

(75) Inventors: Keith W. Wendte, Willowbrook, IL (US); Martin Rund, Catlin, IL (US)

(73) Assignee: CNH Industrial America LLC, New Holland, PA (US)

( * ) Notice: Subject to any disclaimer, the term of this patent is extended or adjusted under 35 U.S.C. 154(b) by 627 days.

This patent is subject to a terminal disclaimer.

(21) Appl. No.: 12/018,907

(22) Filed: Jan. 24, 2008

(65) Prior Publication Data

US 2009/0192654 A1 Jul. 30, 2009

(51) Int. Cl.

| | |
|---|---|
| ***A01B 79/02*** | (2006.01) |
| ***A01B 79/00*** | (2006.01) |
| ***A01C 21/00*** | (2006.01) |
| *A01D 41/12* | (2006.01) |

(52) U.S. Cl.

CPC ............... *A01B 79/005* (2013.01); *A01C 21/00* (2013.01); *A01D 41/1243* (2013.01)

USPC .......................................................... 700/283

(58) Field of Classification Search

CPC .... A01B 79/005; A01B 79/02; A01B 63/004; A01B 63/023; A01G 25/26; A01G 25/09; A01C 23/00–23/007; A01C 23/047; A01C 21/00; A01M 7/005; A01M 7/006; A01M 7/0089; B05B 9/06; B05B 3/18; B05B 1/1663; A01D 41/1243

USPC ........... 700/2, 28, 281–284; 701/50; 702/1–3; 73/170.16; 56/10.1, 10.2 R, 10.2 A; 239/66–70, 722, 723

See application file for complete search history.

(56) References Cited

U.S. PATENT DOCUMENTS

| | | | | | |
|---|---|---|---|---|---|
| 3,716,350 | A | * | 2/1973 | Hashimoto | 71/28 |
| 3,926,369 | A | * | 12/1975 | Pearce | 239/1 |
| 4,052,003 | A | * | 10/1977 | Steffen | 239/71 |
| 4,128,205 | A | * | 12/1978 | Coash | 239/1 |
| RE31,023 | E | * | 9/1982 | Hall, III | 405/37 |
| 4,411,386 | A | * | 10/1983 | Disbrow | 239/728 |
| 4,467,706 | A | * | 8/1984 | Batcheller et al. | 454/70 |
| 4,545,396 | A | * | 10/1985 | Miller et al. | 137/78.3 |

(Continued)

FOREIGN PATENT DOCUMENTS

| | | | | | |
|---|---|---|---|---|---|
| DE | 19831317 | A | | 3/2000 | |
| JP | 06125626 | A | | 10/1994 | |
| JP | 2001232253 | A | * | 8/2001 | B05B 17/00 |
| JP | 2005085059 | A | | 3/2005 | |

*Primary Examiner* — M. N. Von Buhr

(74) *Attorney, Agent, or Firm* — Rebecca L. Henkel

(57) ABSTRACT

An agricultural system which includes at least one agricultural implement with at least one application device for applying crop inputs, where the agricultural implement includes an agricultural harvester and/or an agricultural planter. A databus is connected to the at least one agricultural implement, and at least one input device is connected to the databus. At least one data storage device is connected to the databus, and an application controller is connected to the at least one application device. A processor is connected to the databus and the application controller, where the processor applies inputs to the application controller to adjust and/or optimize in real time a current operation of the application device(s) in order to efficiently and accurately apply the crop inputs.

20 Claims, 11 Drawing Sheets

(56) References Cited

U.S. PATENT DOCUMENTS

| | | | |
|---|---|---|---|
| 4,962,886 A * | 10/1990 | Stockel | 239/11 |
| 4,992,942 A * | 2/1991 | Bauerle et al. | 700/284 |
| 5,133,270 A | 7/1992 | Ledermann et al. | |
| 5,193,744 A * | 3/1993 | Goldstein | 239/69 |
| 5,251,704 A * | 10/1993 | Bourgault et al. | 172/311 |
| 5,361,593 A * | 11/1994 | Dauvergne | 62/89 |
| 5,475,614 A * | 12/1995 | Tofte et al. | 700/283 |
| 5,479,339 A * | 12/1995 | Miller | 700/16 |
| 5,499,198 A * | 3/1996 | Gaidos et al. | 700/283 |
| 5,566,069 A * | 10/1996 | Clark et al. | 702/2 |
| 5,653,389 A * | 8/1997 | Henderson et al. | 239/69 |
| 5,668,719 A * | 9/1997 | Bobrov et al. | 702/2 |
| 5,678,771 A * | 10/1997 | Chapman | 239/727 |
| 5,704,546 A * | 1/1998 | Henderson et al. | 239/1 |
| 5,712,782 A * | 1/1998 | Weigelt et al. | 701/50 |
| 5,740,038 A * | 4/1998 | Hergert | 700/284 |
| 5,842,307 A * | 12/1998 | May | 47/1.7 |
| 5,911,362 A * | 6/1999 | Wood et al. | 239/1 |
| 5,920,827 A | 7/1999 | Baer et al. | |
| 5,927,603 A * | 7/1999 | McNabb | 239/63 |
| 5,995,902 A * | 11/1999 | Monson | 701/202 |
| 6,076,044 A | 6/2000 | Brown | |
| 6,089,532 A * | 7/2000 | Rohloff et al. | 251/61.4 |
| 6,108,590 A * | 8/2000 | Hergert | 700/284 |
| 6,119,531 A | 9/2000 | Wendte et al. | |
| 6,126,088 A * | 10/2000 | Wilger et al. | 239/170 |
| 6,236,907 B1 | 5/2001 | Hauwiller et al. | |
| 6,270,291 B2 * | 8/2001 | Gamliel et al. | 405/263 |
| 6,285,938 B1 * | 9/2001 | Lang et al. | 701/50 |
| 6,409,093 B2 * | 6/2002 | Ulczynski et al. | 239/1 |
| 6,434,258 B2 * | 8/2002 | Wiens | 382/113 |
| 6,453,216 B1 * | 9/2002 | McCabe et al. | 700/284 |
| 6,488,213 B2 * | 12/2002 | Ohga et al. | 236/49.3 |
| 6,540,155 B1 * | 4/2003 | Yahav | 239/70 |
| 6,606,542 B2 * | 8/2003 | Hauwiller et al. | 700/283 |
| 6,607,146 B1 * | 8/2003 | Alness et al. | 239/159 |
| 6,686,878 B1 | 2/2004 | Lange | |
| 6,702,200 B2 * | 3/2004 | Solie et al. | 239/172 |
| 6,726,120 B2 | 4/2004 | Schaffter et al. | |
| 6,797,673 B1 * | 9/2004 | Worthley et al. | 504/148 |
| 6,820,828 B1 * | 11/2004 | Greenwalt | 239/726 |
| 6,862,083 B1 * | 3/2005 | McConnell et al. | 356/4.01 |
| 6,871,796 B2 * | 3/2005 | Jones et al. | 239/171 |
| 6,907,319 B2 | 6/2005 | Hoelscher et al. | |
| 6,947,810 B2 * | 9/2005 | Skinner | 700/283 |
| 6,976,913 B2 * | 12/2005 | Duquesne et al. | 460/111 |
| 7,103,451 B2 * | 9/2006 | Seal et al. | 700/284 |
| 7,124,964 B2 * | 10/2006 | Bui | 239/519 |
| 7,143,980 B2 * | 12/2006 | Heller et al. | 244/136 |
| 7,167,797 B2 * | 1/2007 | Faivre et al. | 701/214 |
| 7,184,859 B2 * | 2/2007 | Hood et al. | 700/284 |
| 7,184,892 B1 | 2/2007 | Dyer et al. | |
| 7,184,965 B2 * | 2/2007 | Fox et al. | 705/7.29 |
| 7,213,772 B2 * | 5/2007 | Bryan et al. | 239/311 |
| 7,278,294 B2 * | 10/2007 | Giles et al. | 73/64.53 |
| 7,306,174 B2 * | 12/2007 | Pearson et al. | 239/663 |
| 7,388,662 B2 * | 6/2008 | Cantin et al. | 356/338 |
| 7,403,840 B2 * | 7/2008 | Moore et al. | 700/284 |
| 7,487,024 B2 * | 2/2009 | Farley et al. | 701/50 |
| 7,494,070 B2 * | 2/2009 | Collins | 239/63 |
| 7,562,681 B1 * | 7/2009 | Hermansen | 141/114 |
| 7,610,125 B2 * | 10/2009 | Fitzner et al. | 701/24 |
| 7,640,797 B2 * | 1/2010 | Smith et al. | 73/170.02 |
| 7,708,206 B2 * | 5/2010 | Ivans | 239/1 |
| 7,735,752 B1 * | 6/2010 | Songer et al. | 239/171 |
| 7,742,862 B2 * | 6/2010 | Anderson et al. | 701/50 |
| 7,769,494 B1 * | 8/2010 | Simon et al. | 700/284 |
| 7,778,736 B2 * | 8/2010 | Sutardja | 700/284 |
| 7,789,321 B2 * | 9/2010 | Hitt | 239/63 |
| 7,805,221 B2 * | 9/2010 | Nickerson | 700/284 |
| 7,848,865 B2 * | 12/2010 | Di Federico et al. | 701/50 |
| 2002/0002425 A1 * | 1/2002 | Dossey et al. | 700/284 |
| 2002/0071916 A1 * | 6/2002 | Rawlings | 427/421 |
| 2002/0100819 A1 * | 8/2002 | Taylor et al. | 239/543 |
| 2002/0156574 A1 | 10/2002 | Fortin | |
| 2003/0111546 A1 * | 6/2003 | Schaffter et al. | 239/69 |
| 2003/0230443 A1 | 12/2003 | Cramer et al. | |
| 2004/0039489 A1 * | 2/2004 | Moore et al. | 700/284 |
| 2004/0089735 A1 * | 5/2004 | Drechsel | 239/195 |
| 2005/0072862 A1 * | 4/2005 | Skinner | 239/542 |
| 2006/0030990 A1 | 2/2006 | Anderson et al. | |
| 2006/0095175 A1 | 5/2006 | deWaal et al. | |
| 2006/0273189 A1 * | 12/2006 | Grimm et al. | 239/146 |
| 2007/0005209 A1 * | 1/2007 | Fitzner et al. | 701/50 |
| 2007/0026914 A1 | 2/2007 | Anderson et al. | |
| 2007/0225882 A1 * | 9/2007 | Yamaguchi et al. | 701/36 |
| 2007/0239337 A1 * | 10/2007 | Anderson | 701/50 |
| 2007/0239472 A1 * | 10/2007 | Anderson | 705/1 |
| 2008/0185455 A1 * | 8/2008 | Crum | 239/1 |
| 2008/0191054 A1 * | 8/2008 | Di Federico et al. | 239/69 |
| 2009/0025794 A1 * | 1/2009 | Dorendorf et al. | 137/1 |
| 2009/0118125 A1 * | 5/2009 | Kobayashi et al. | 504/235 |

* cited by examiner

METHOD AND APPARATUS FOR OPTIMIZATION OF AGRICULTURAL FIELD OPERATIONS USING WEATHER, PRODUCT AND ENVIRONMENTAL INFORMATION

FIELD OF THE INVENTION

The present invention relates to agricultural implements, and, more particularly, to a method and apparatus for optimization of an agricultural application, such as a spraying operation, using weather, product and environmental information.

BACKGROUND OF THE INVENTION

In modern day agriculture, there are many field related activities that occur which are affected by the prevailing weather conditions. As the methods for precision agriculture have advanced, it now is possible to collect and record various pieces of information such as weather data. Prevailing weather conditions during certain key operations can affect the quantity and/or quality of the operation or the harvested crop. This information can also be quite useful later on when analyzing the results from a harvested crop. Quite often there are areas within a field where lower crop quality or yields occur. Recording the weather data allows the producer to use this information to determine if the reason for a low yield in a certain area was caused by prevailing weather conditions during a key operation.

It is also quite common for agriculture producers to record weather information related to applications of inputs for documentation purposes. Quite often this is mandated by certain governmental bodies at the federal, state, and county level due to regulations, restrictions, or in order to qualify for various government programs. This is especially prevalent when it comes to the application of fertilizers, herbicides and pesticides. One current method used for recording weather data, requires the operator to use stationery type weather equipment for recording information such as humidity, temperature, wind direction, wind speed, etc. and then recording it in a log book. This method can have many drawbacks. Some of the drawbacks are that the operator forgets to record the information, the information changes over the course of time as the inputs are being applied, or the weather conditions are different in various parts of the field.

Although some teaching is known which includes more current weather information, these applications do not concern themselves with making adjustments in real time to optimize an agricultural input or machine operation. These are primarily concerned with what can be done with logged data or optimization of the amount or application of crop inputs overall without consideration of real time variations in conditions which lead to crop yield variations within a field.

What is needed in the art is a method and apparatus for optimization of an agricultural application operation using weather, product and/or environmental information, particularly which includes a mobile weather station which is directly connected to the equipment which is performing the agricultural application operation, and which data is used in real time to adjust parameters or inputs of the agricultural application or machine operation.

SUMMARY OF THE INVENTION

The invention comprises, in one form thereof, an agricultural system comprising at least one agricultural implement having at least one application device for applying crop inputs, where the agricultural implement(s) includes an agricultural harvester and/or an agricultural planter. A databus is connected to the at least one agricultural implement, and at least one input device is connected to the databus. At least one data storage device is connected to the databus, and an application controller is connected to the at least one application device. A processor is connected to the databus and the application controller, where the processor applies inputs to the application controller to adjust and/or optimize in real time a current operation of the application device(s) in order to efficiently and accurately apply the crop inputs.

The agricultural implement may include an agricultural spreader for applying the crop inputs, and the at least one input device includes a mobile weather station connected the agricultural implement.

The mobile weather station may provide at least a wind speed information and a wind direction information near the agricultural spreader, where the wind speed information and the wind direction information is provided to the databus.

The mobile weather station may provide temperature information and humidity information near the agricultural spreader, and the temperature information and the humidity information are provided to the databus.

The agricultural implement may be a combine, and the agricultural spreader includes at least one crop residue flow distributor, where the wind speed information and the wind direction information are used by the application controller to automatically adjust a position of at least one said crop residue flow distributor.

The agricultural implement may be a planter, and the agricultural spreader includes spreader head, where the wind speed information and the wind direction information are used by the application controller to automatically adjust a position of the spreader head.

The wind speed information and the wind direction information may be used by the application controller to automatically control a position of the agricultural spreader to reduce a drift of the crop inputs.

Further, the data storage device(s) may include field characteristics information, chemical product data, and/or logged data provided to the databus. The processor can use the field characteristics information, the chemical product data, and/or the logged data, in combination with the wind speed information and the wind direction information, to determine an optimized path planning for an operation of the agricultural spreader.

The optimized path planning may allow the agricultural spreader to apply a crop input to a field in a specific direction.

The input device(s) can include a wireless communication device providing weather forecast data to the databus and a user interface, and the processor provides instructions to the user interface for an operator of the agricultural system based on the weather forecast data.

If the weather forecast data indicates an increasing wind condition and a changing wind direction, the processor may provide instructions to the user interface for an operator to spray sensitive field areas first or wait until a favorable wind shift.

The input device may be a user interface, an application settings device, a vehicle location sensor, a wireless communication device, and a mobile weather station.

The crop inputs may include a fertilizer, a herbicide, a pesticide, and/or a crop residue.

The input device(s) may include a mobile weather station connected to the agricultural implement(s), where the mobile weather station is packaged in a single unit with a wind speed sensor, a wind direction sensor, a temperature sensor and/or a humidity sensor. The mobile weather station can be transportably connected to one of the agricultural implements so that it can be easily moved to another of the agricultural implements.

The input device may include a mobile weather station, connected to at least one agricultural implement, and including a wind speed sensor, a wind direction sensor, a temperature sensor and/or a humidity sensor. The mobile weather station can control a temperature and a humidity inside a cab of the agricultural implement for operator comfort and the most efficient use of air conditioning and heating components associated with the cab.

The input device(s) may include a mobile weather station, connected to the agricultural implement(s), and include a wind speed sensor, a wind direction sensor, a temperature sensor and/or a humidity sensor, where the mobile weather station produces wind speed data, wind direction data, temperature data and/or humidity data. All data is shared on the databus which enables the processor to make automatic adjustments for threshing and/or harvesting of grain, fiber, hay and/or forage products.

The input device(s) may include a mobile weather station connected to the agricultural implement(s), where the mobile weather station produces wind speed data, wind direction data, temperature data and/or humidity data, where any of the data is used by the processor to control the at least one application device to optimize a residue spreading quality in a harvesting operation.

The invention comprises, in another form thereof, a method of manufacturing an agricultural implement which includes the steps of: providing at least one agricultural implement having at least one application device for applying crop inputs, the agricultural implement(s) including an agricultural harvester and/or an agricultural planter; configuring a combination communication and control system including a databus, at least one input device connected to the databus, at least one data storage device connected to the databus, an application controller connected to the application device(s), and a processor connected to the databus and the application controller, the processor for applying inputs to the application controller to adjust and/or optimize in real time a current operation of the application device(s) in order to efficiently and accurately apply the crop inputs; and connecting the combination communication and control system to the agricultural implement(s).

The invention comprises, in another form thereof, a method of operating an agricultural system which includes the steps of: providing at least one agricultural implement which includes an agricultural spreader for applying a crop input, a databus connected to the agricultural implement(s), at least one input device connected to the databus, at least one data storage device connected to the databus, an application controller connected to the at least one application device, and a processor connected to the databus and the application controller, the processor for applying inputs to the application controller; entering boundaries for a field and other sensitive areas based on one of an operator input and a stored database in the at least one data storage device; entering the spray crop input on one of an operator input and a stored database; obtaining current weather data from a mobile weather station; calculating a time required to apply the crop input to the field; and determining if weather conditions allow a safe application of the crop input on the field.

The determining step may include the substep of considering a weather forecasted data provided from one of a wireless communication device and an operator input.

The method according to the present invention may further include the step of calculating an optimum travel plan with the processor for the agricultural implement wherein the optimum travel plan optimizes the application of the crop input.

The method may further include the step of adjusting the agricultural spreader with the application controller to adjust and/or optimize in real time a current operation of the agricultural spreader to efficiently and accurately apply the crop input.

The calculating an optimum travel plan step may include the substep of calculating an optimum location to begin spreading of the crop input.

The method may include the steps of operating the agricultural spreader to apply the crop input, and monitoring the current weather data until the field application is complete, the monitoring step occurring concurrently with the operating step.

The method further may include the steps of determining if it is safe to continue the field spraying based on the current weather data, and recording the current weather data during the time required to spray the field.

Various other features of the present invention will be made apparent from the following detailed description of the drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
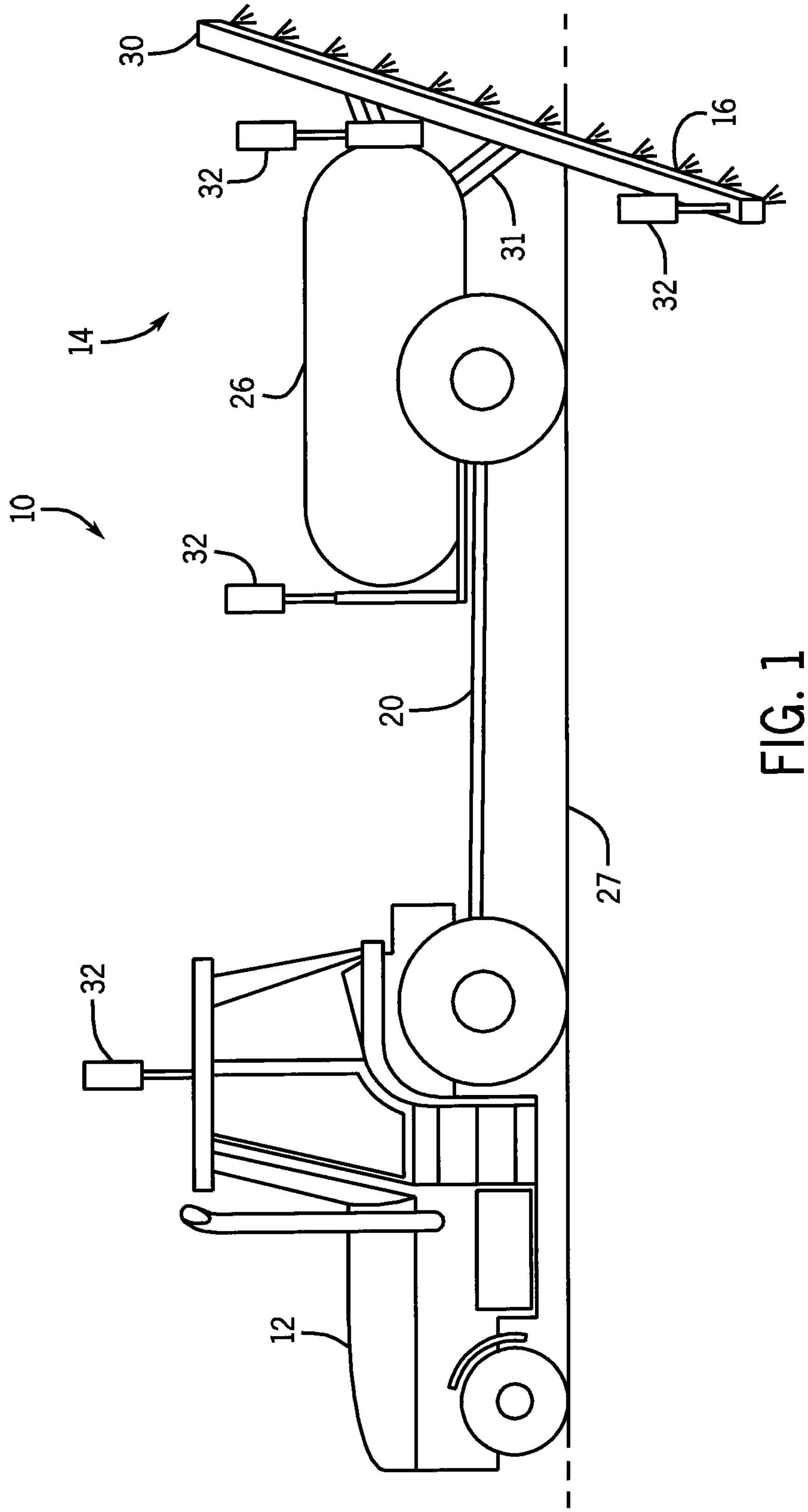
FIG. 1 is a schematic side view, and partially perspective (boom), of an embodiment of an agricultural system according to the present invention, particularly showing an agricultural implement including an agricultural sprayer.
Figure 2:
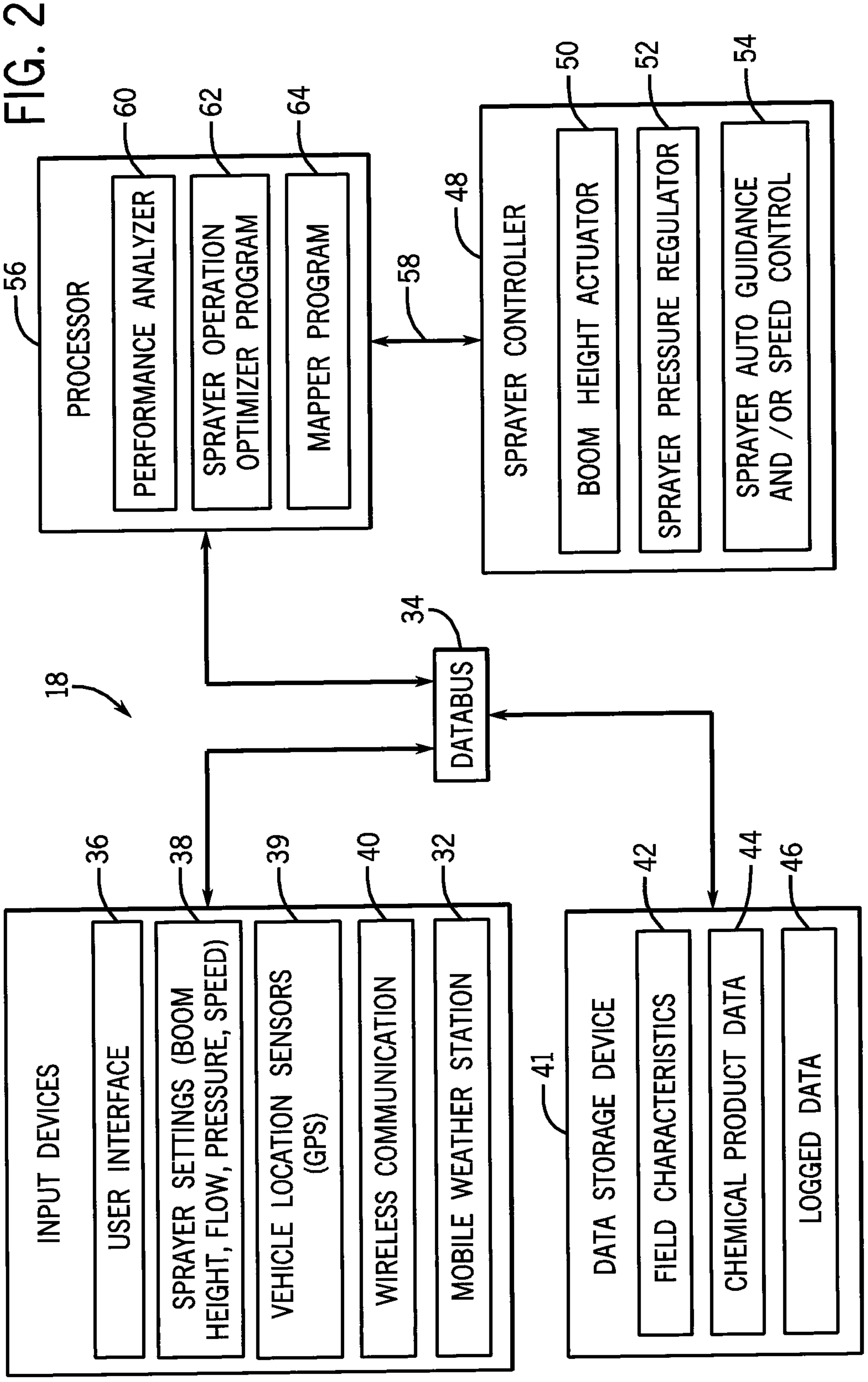
FIG. 2 is a block diagram view of an embodiment of a communication and control system which is part of the agricultural systems of FIGS. 1, 4 and 5, according to the present invention.

Referring now to the drawings, and more particularly to FIGS. 1 and 2, there is illustrated an agricultural system 10 which includes at least one agricultural implement such as tractor 12 and sprayer 14, where sprayer 14 has at least one application device, such as nozzles 16, for applying crop inputs (fertilizer, herbicide, pesticides, and the like, for this embodiment). Agricultural system 10 further includes communication and control system 18 (FIG. 2) which can be integrated into at least one of implements 12, 14 (or other implements as are described below) via electronic/electrical modules, cabling, flexible printed circuit harnesses, wiring harnesses, connectors, software, firmware, and the like.

Tractor 12 is connected to sprayer 14 by drawbar 20. Tank 26 can hold a variety of crop inputs such as fertilizer, herbicide, pesticides, and the like, for dispensing onto the field 27 through nozzles 16. Nozzles 16 are shown at rearward nozzle support boom 30; however, nozzles 16 can be installed in a forward nozzle support boom (not shown), and at periodic locations along the complete length of the boom. At least one mobile weather station 32 can be mounted to any of the locations shown such as at tractor 12, a forward nozzle support boom (not shown), or rearward nozzle support boom 30; boom support 31, or other locations. Mobile weather stations 32 can contain any of the sensors that are normally found on a stationery weather station, such as temperature, wind speed, wind direction, relative humidity, barometric pressure, cloud cover, and trends thereof. All of the sensors can be contained in a relatively small package that is attached to either of the implements 12 and 14 and can have mechanical and electrical connectors that allow them to be moved to other implements.

Communication and control system 18 can include a databus 34 which is connected to at least one of implements 12, 14. At least one input device can be connected to databus 34. Input devices can include, but are not limited to, a user interface 36, a sprayer settings unit 38, vehicle location sensor 39 (such as a GPS), wireless communication unit 40 (receiver and transmitter or transceiver) and at least one mobile weather station 32. User interface 36 can include keyboards, keypads, readable memory drives, switches, dials, indicators, and other input devices to allow an operator to provide settings and input to system 18.

At least one data storage device 41 is connected to databus 34. Data storage device 41 can be, but is not limited to, data storage devices or peripheral devices such as a CD, DVD, floppy or other drives; processor memory, flash memory, EEPROMs, RAM, ROM, etc. The types of data which can be stored on data storage device(s) 41 can include agricultural field 27 characteristics 42, chemical production data 44, and logged data 46.

An application controller 48 is connected to nozzles 16 and/or other application devices. Application controller 48 can be a sprayer controller, as shown, which includes elements such as a boom height actuator 50, a sprayer pressure regulator 52, and sprayer auto guidance and/or speed control 54.

A processor 56 is connected to databus 34 and application controller 48, where processor 56 applies inputs 58 to application controller 48 to adjust and/or optimize in real time a current operation of nozzles 16 in order to efficiently and accurately apply the crop inputs. Processor 56 can include and/or execute a performance analyzer 60, a sprayer operation, or other application operation, an optimizer program 62, and a mapper program 64. Processor 56 can be a microprocessor, application specific integrated circuit, single or multiple board computing device, or other computing/controlling device.

The present invention discloses a method and apparatus to optimize in real time, or in other words as the operation is occurring, the current operation in order to efficiently and accurately apply the crop inputs. Placement of a mobile weather data station 32 (or multiple weather stations) according to the present invention can be located as near to the nozzle 16 which applies the chemical as possible. This may typically be on the nozzle support boom 30 of sprayer 14, or other locations depending on the implement. Since spray control is being optimized based on wind speed, among other things, it can be important to get the wind speed and direction that the nozzle is seeing. Since the nozzles are often located nearer to the ground than the operator cab, wind speed and direction may not be the same as wind characteristics near the operator cab.

Although the path of an agricultural sprayer can automatically be adjusted in order to compensate for sprayer overlap or skips caused by altered spray patterns due to wind speed and direction, a better solution, according to the present invention, is to reduce or eliminate the spray pattern drift. The wind speed and direction information, and temperature and humidity, can be used by the present invention to automatically control the droplet size and therefore reduce the drift. This is made possible by commercial spraying systems on the market that allow droplet size control without having to change the chemical application rate (CaseIH AIM Command System) when used in conjunction with the present invention.

An additional adjustment can be made to automatically lower the boom height of the sprayer in order to reduce drift. This is possible because today's sprayers are normally setup to provide double coverage by adjacent nozzles. By lowering the boom to half height, only single coverage is achieved. This is not the preferred practice, however, if wind velocity is too great, the advantage of reducing the nozzle height and therefore reducing drift far outweighs the advantage of achieving double coverage. This is especially critical when applying liquid chemical next to other crops or sensitive environmental areas.

The present invention can provide optimized path planning. In certain situations, it may be more advantageous to apply chemicals to a field in a specific direction. The on-board computer software of the present invention is able to advise the operator which direction the sprayer is preferred to apply chemicals, especially when applying next to sensitive environmental areas or other crops. Inputs to the computer program considers the chemical(s) being applied, crops being grown in adjacent fields, proximity from sensitive areas such as streams, wildlife habitat, etc. Information regarding the chemical can be wirelessly transmitted to the sprayer from commercially available chemical product databases.

Weather data in the present invention includes weather forecast. If, for example, the weather forecast calls for winds to increase or shifting directions later on, the operator is advised to spray sensitive areas first or wait until the wind shifts to a different direction.

The system architecture according to the present invention can include a variety of inputs such as: chemical to be applied; adjacent crops or habitats to the application field (from operator inputs or data storage); previous, current, and future crops for this application field; sensitive environmental areas (from operator inputs or data storage); field boundary (operator records or from data storage).

Downloaded data can be supplied to the processor (if wireless or other network connection available, as can be chemical data sheet information) from the chemical supplier, and the weather forecast from a weather service. Additionally, real time weather information, including wind speed and velocity, temperature, barometric pressure, humidity, and trends thereof, can be provided by the mobile weather station on the databus.

The vehicle location and operating parameters can be available on the databus, also in real time via the input devices, data storage devices, processor and/or sprayer (or other application) controller, which include chemical application rate, chemical operating pressure, latitude/longitude coordinates, vehicle speed, vehicle direction.

The processor 56 and the optimization software (which can be resident on any of the data storage devices or peripheral devices such as a CD, DVD, floppy or other drives, firmware on the processor, flash memory, EEPROMs, RAM, ROM, etc.) can include the onboard processor with the user interface. The processor processes information from data obtained from databus and analyzes the sprayer performance. Optimization software can be for machine adjustment, path planning, and operation timing. The processor also presents a sprayer path plan on the user interface by using a mapper program.

Data storage has at least one suitable storage device for logging data to be used for documentation. In addition, and/or as an alternative, data is wirelessly transmitted to a home office. The spray (or other application) controller can convert information from the processor to commands to the agricultural implement, such as sprayer 14, in order to optimize spray operation. The controller 56 can use the path plan from the processor mapper program and generates guidance commands to the sprayer (when equipped). Sprayer adjustments include boom height, operating pressure, flow rate and others. When the sprayer is equipped with a direct injection system, the controller can control the flow rate of the chemical being applied (not the carrier)

Figure 3A:
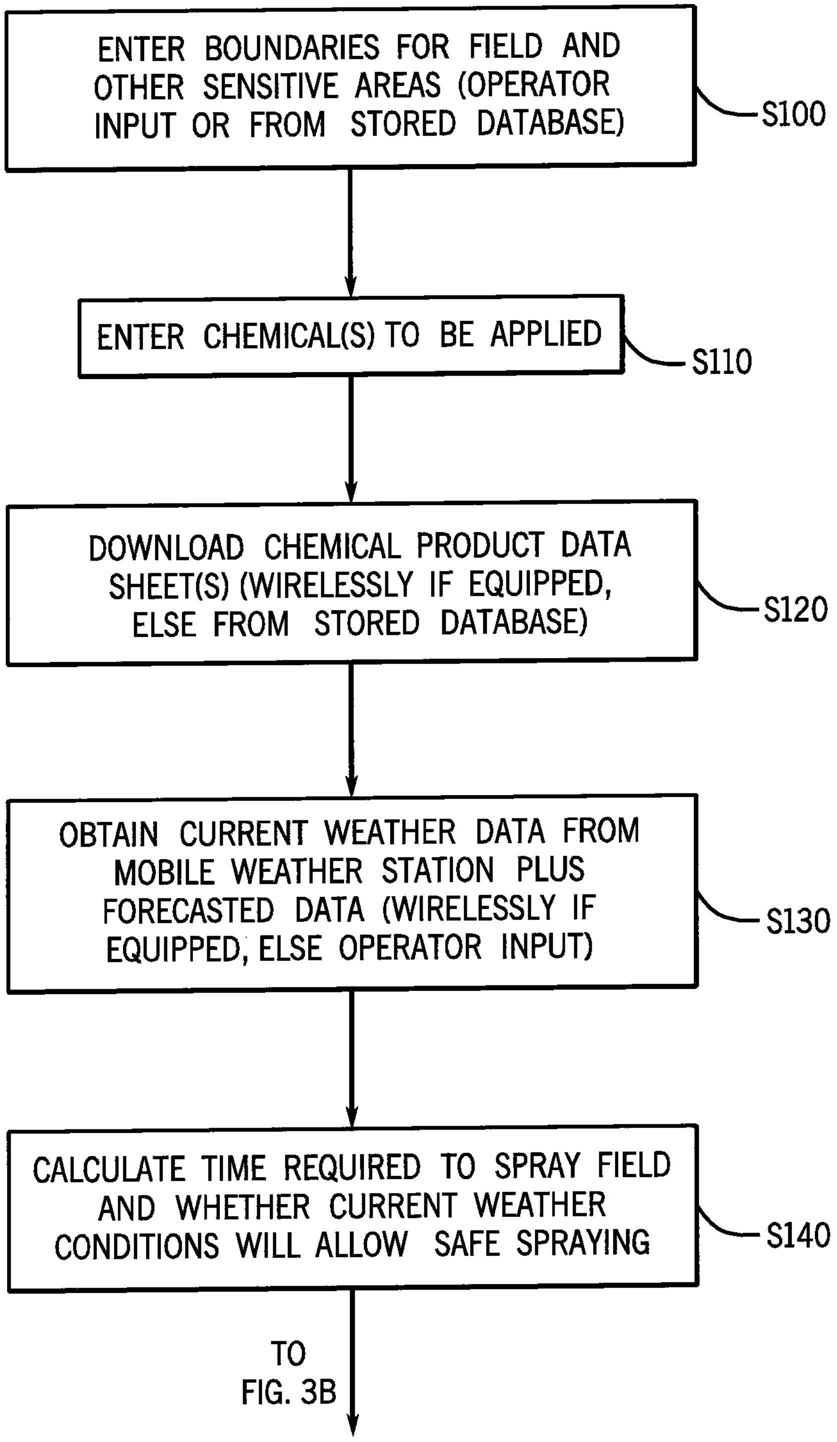
FIG. 3A is a flowchart view of an embodiment of an agricultural system according to the present invention.
Figure 3B:
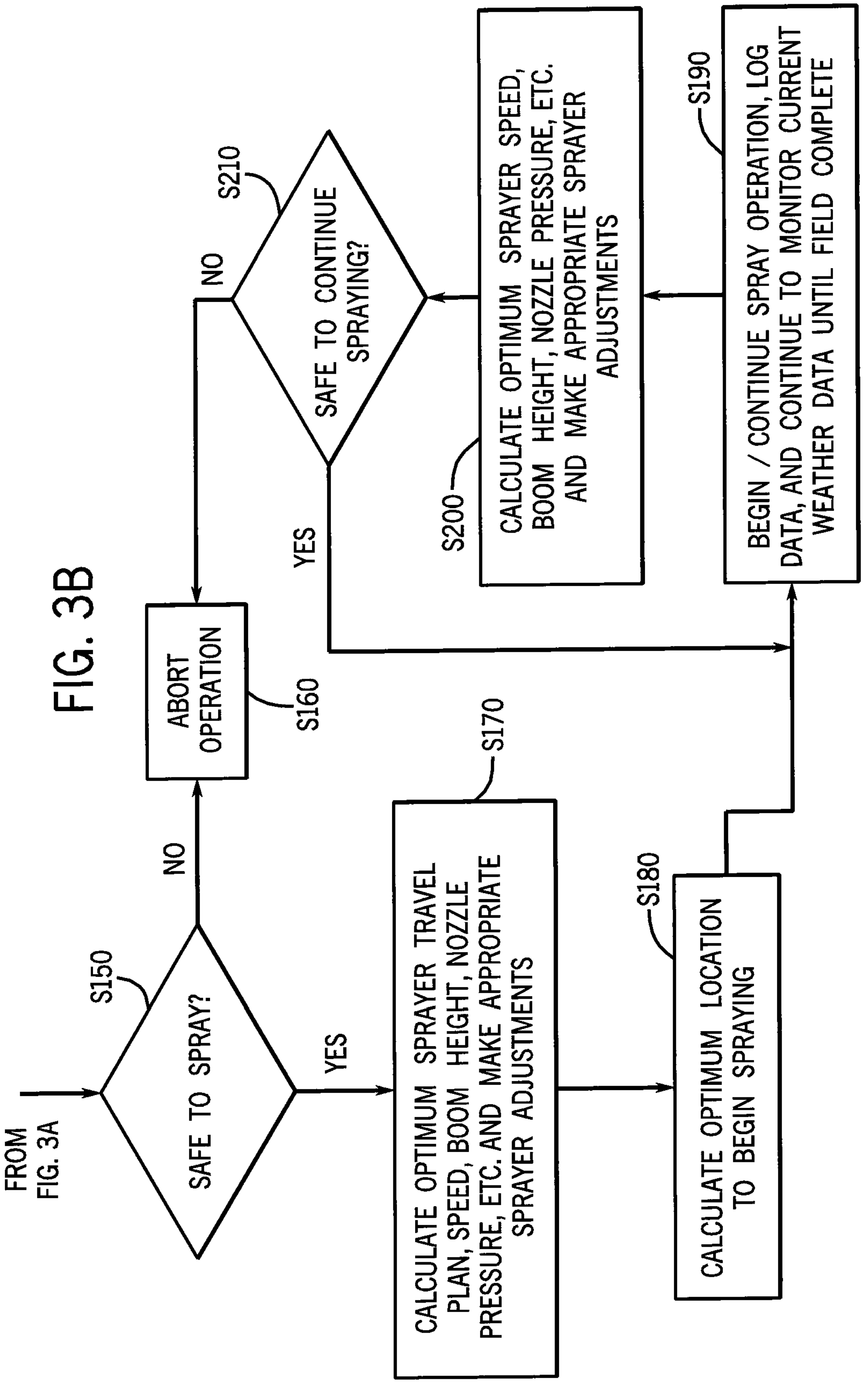
FIG. 3B is a continuation of the flowchart of FIG. 3A.

Referring more particularly to FIGS. 3A and 3B, there is shown a flowchart which illustrates a method according to an embodiment of the present invention. In step S100, boundaries are entered for field and other sensitive areas (operator input or from stored database, for example). In step S110, chemical(s) to be applied are entered, and in step S120 chemical product data sheet(s) are downloaded (can be wirelessly if equipped, or otherwise, from stored database). Current weather data is obtained from mobile weather station plus forecasted data (wirelessly if equipped, else operator input) in step S130. In step S140, the time required to spray field and whether current weather conditions allow safe spraying is calculated. Step S150 is a decision step which determines if it is safe to spray. If it is not safe to spray, then the operation is aborted in step S160; if it is safe to spray, then step S170 calculates optimum sprayer travel plan, speed, boom height, nozzle pressure, etc. and makes appropriate sprayer adjustments. Step S180 calculates optimum location to begin spraying and, in step S190 the spray operation is begun/continued, data is logged, and the current weather data is monitored until the field is complete. Step S200 recalculates the optimum sprayer speed, boom height, nozzle pressure, etc. based on the real time data from step S190 (and other steps if appropriate) and makes appropriate sprayer adjustments. Step S210 is a decision step which determines if it is safe to continue spraying. If it is not safe to spray, then the operation is aborted in step S160; if it is safe to spray, then step S190 is reasserted and this loop continues until the operation is aborted and/or the operation is complete.

This invention basically moves all of the sensors that are normally found on a stationery weather station, such as temperature, wind speed, wind direction, relative humidity, barometric pressure, cloud cover, and trends thereof, onto the vehicle. All of the sensors can be contained in a relatively small package that is attached to the vehicle and can be readily moved if necessary.

The present invention automatically collects and logs weather data whenever a field operation is taking place. This includes any operation where a mobile vehicle is in the field or on the road. It includes application (liquid or dry) of soil or crop inputs, such as insecticides, herbicides, fertilizers, manure, seed, etc., as well as the harvest of any kind of grain, fiber, hay, or forage. The data is logged along with the all the typical input application or harvest data which also includes the GPS location of the vehicle within the field.

The system according to the present invention gives the operator the flexibility of setting the automated data logging intervals or the ability to choose recording weather data at the beginning, end, or at any time during a particular field operation. The mobile weather station can be packaged in a single unit with all the appropriate weather sensors so that it can be easily moved from vehicle to vehicle. This is especially important for vehicles that operate for only one or two months out of the year. In addition to the weather data being logged for later use, it is placed on the vehicle's data bus, such as a CAN bus, so that the data can be shared with other systems on the vehicle, thus optimizing vehicle operation. Examples of where this can be important are automatically controlling the fuel and air ratios for optimum engine efficiency. The input can also be used for controlling temperature and humidity inside the cab for operator comfort and most efficient use of air conditioning and heating components. Sharing the data on the bus also enables the vehicle's performance computer to make automatic adjustments for threshing or harvesting grain, fiber, hay and forage products.

By logging the weather data, these features can quite often lead to service technicians being able to diagnose machine problems that occurred during input application or harvest. This is especially important when fault codes are generated during operation in the field. Knowing the exact outside weather data during the fault occurrence can lead to an immediate diagnosis of the problem.

The mobile weather station can also wirelessly transmit weather data to other vehicles or base stations so that other operations may use the data for fleet or vehicle optimization. This is especially helpful for those vehicles that are not equipped with their own mobile weather station. Potential crop purchasers may want to use the logged weather data for documenting the quality of the harvested crop for the purposes of meeting certain quality parameters. Examples of this would include the harvest of soybeans when humidity get very low, since this quite often results in more soybean cracks or header losses. Another example would be only harvesting hay when humidity is above a certain level in order to avoid excessive leaf losses. Furthermore, the invention provides the ability to set certain minimum or maximum weather parameter limits in order to preserve the quality of the crop being harvested or to insure the quality of the application method. If these limits are exceeded an audible and/or visual warning is given to the operator or the operation can be automatically terminated.

By logging the weather data, analysis of yield data (for example) can be used to determine if prevailing weather conditions were the causes of yield losses, machine degradation, or crop quality problems in various parts of the field. The same methodology can be used for input application. An example would be evaluating weed control during various crop growth stages and comparing it to the humidity records where it may have been too high when applying a contact herbicide at the beginning of a field, but was much lower when the field was finished. Applying crop fumigants would be another example where temperature, humidity, wind speed and direction can be a factor. Other examples may include defending an operator against lawsuits where a neighboring operator claims their crop was damaged by a crop input due to high wind speeds or wind direction.

Since wind speed and direction are normally measured from a stationery weather station, the tractors equipped with GPS could be used to determine the direction and speed of the tractor. This data is necessary in making the necessary corrections to the wind speed and direction.

The present invention can provide automatic weather data gathering and logging whenever crop inputs are being applied. The data logging intervals can be set by the operator. The data is logged along with the all the typical input application data which also includes the GPS location of the vehicle within the field. The present invention also provides the flexibility of allowing the operator to "choose" if he wants to only record weather data at the beginning and end of a particular field operation. Additionally, the mobile weather station is packaged in a single unit with all the appropriate weather sensors so that it can be easily moved from vehicle to vehicle.

The data can be placed on the vehicle's CAN bus so that the data can be shared with other systems on the vehicle and used to optimize engine efficiency and cab comfort. Sharing the data on the bus enables the vehicle's performance computer to make automatic adjustments for threshing or harvesting of grain, fiber, hay and forage products. Using logged weather data in order for service technicians to diagnose machine problems that occurred during various field operations.

In other aspects, the present invention provides for wirelessly transmitting, weather data to other vehicles or base stations so that other operations may use the data for fleet or vehicle optimization. The present invention also provides for the use of logged weather data for documenting the quality of the harvested crop for the purposes of meeting quality parameters set by potential purchasers of the crop. Use of logged data determines if prevailing weather conditions were the causes of yield losses or machine degradation in various parts of the field.

Further, the present invention provides the ability to set certain minimum or maximum weather parameter limits in order to preserve the quality of the crop being harvested or to insure the quality of the application method. An audible or visual alert is sounded or the machine can be automatically shut down when these limits are exceeded. The present invention can use the vehicle GPS receiver to determine vehicle speed and direction and applies this information to make the necessary corrections to the wind speed and direction data obtained from the mobile weather station.

FIGS. 4A-4E illustrate an agricultural system 70 which includes agricultural harvesting equipment such as a combine 72 (described in more detail in U.S. Pat. No. 6,119,531 which incorporated by reference as if fully setforth herein) which is used to harvest a commodity. Combine 72 is depicted as a mobile agricultural work vehicle including a frame 74, to which are installed a main body 76, an operator's station or cab 78, a grain tank 80, an engine (not shown), and ground support devices including drive wheels 82 and steerable wheels 84. However, the ground support devices could also be endless crawler tracks. Agricultural system 70 further includes communication and control system 18, as has been previously described, which can be integrated into combine 72 via electronic/electrical modules, cabling, flexible printed circuit harnesses, wiring harnesses, connectors, software, firmware, and the like.

Combine 72 includes a header 86 configured to cut, snap, or otherwise sever plant stalks near the soil surface and convey the resulting crop material to a central region of header 86, where a feed conveyor, or feeder 88, conveys it into main body 76. A thresher 90 is located within main body 76 and is disposed to receive the crop materials from feeder 88. Thresher 90 separates kernels of grain from larger pieces of other crop materials, referred to herein as trash. The grain kernels are then conveyed to a winnowing, or cleaning, section 92, where smaller bits of trash, debris, dust, etc. are removed by mechanical agitation and a stream of air. Although combine 72 is depicted as an axial-flow combine (i.e., having a thresher with a generally longitudinally disposed axis of rotation), the concepts described herein may also be used on other types of combines including those having threshers with transversely disposed axes of rotation.

Quite often a machine of this nature must harvest additional material other than the main product in order to complete the separation process. The excess material (herein referred to as crop residue) is typically chopped or shredded and must be distributed evenly at the rear 94 of the machine. An example of a spreader is given in U.S. Patent. No. 2007/0026914 which incorporated by reference as if fully setforth herein). A mobile weather station 32, as has already been described, can be connected to combine 72 as shown or similarly, or to a spreader 96 according to the present invention, and can be used to optimize the residue spreading function. Mobile weather stations 32 can also be connected to agricultural system 70 at a variety of other locations, and particularly to communication and control system 18 as described above, and adapted to this harvesting application. As wind direction and speed change, this typically reduces the harvesting machines ability to spread the residue uniformly on the ground. By using the information provided by the mobile weather station, such as wind speed, wind direction, and humidity, the adjustments for residue spreading can be automatically made in real time.

Referring particularly to FIGS. 4B-4E, a rear end 94 of a self-propelled agricultural combine 72 is shown, including a vertical crop residue spreader 96 operable for spreading straw, stalks, and other crop residue and trash that has been separated from the grain of the crops by a threshing mechanism (not shown) of combine 72 located forwardly of rear end 94. The straw, stalks and the like are propelled rearwardly by rotating beaters or the like (also not shown) from the threshing mechanism and downwardly through a rear cavity of combine 72 to spreader 96 for spreading and optionally chopping thereby, all in the well known manner.

Spreader 96 includes a housing 98 of sheet metal or other construction containing a pair of side by side rotary impellers 100 and 102 rotatable in opposite predetermined rotational directions, denoted by arrows A and B, about a pair of rotational axis 104 and 106, respectively. Here, it should be understood that impellers 100 and 102 are representative of a variety of rotary devices that can be utilized in a spreader of this type, such as a rotor having fixed blades, or carrying a plurality of knives, such as flail knives, for propelling the crop residue outwardly from the housing. The spreader can additionally optionally include a rank of fixed knives through which the rotating knives pass for chopping crop residue.

Impellers 100 and 102 are rotated by suitable driving elements, such as by conventionally constructed and operable hydraulic motors powered by pressurized hydraulic fluid received from a pump (not shown) of combine 72, an electric motor, belt, or the like, again in the well known manner. Rotational axes 104 and 106 extend at least generally in the fore and aft directions, that is, generally forwardly and rearwardly with respect to combine 72, and are generally horizontal or oriented at a small acute angle to horizontal, depending on an orientation or tilt of spreader 96 on combine 72, which can be optionally variable and adjustable in the well known manner.

Housing 98 of spreader 96 includes spaced, opposed radial side walls, and a rear wall 108 extending therebetween across the width of spreader 96, defining an internal cavity containing impellers 100 and 102. Housing 98 defines a forwardly and upwardly facing inlet opening for receiving the residue flow from the threshing system, and a downwardly facing discharge opening 110, through which the residue is propelled downwardly and in opposite sideward directions by impellers 100 and 102, respectively.

Residue flow within housing 98 is propelled by rotating impellers 100 and 102 in the predetermined rotational directions A and B along circumferential flow paths, at speeds equal to or increased relative to the inlet speed of the residue flow such that the residue does not build up at the inlet and is expelled from housing 98 through discharge opening 110 at a corresponding speed. In the instance wherein spreader 96 is solely used for spreading, the speed imparted to the residue by impellers 100 and 102 will be sufficient for airborne travel of the residue a substantial sideward distance from combine 72 for deposition on regions of the agricultural field over which combine 72 has just traveled and from which the crops have been harvested.

As noted above, it is desired in many instances to distribute the crop residue discharged by impellers 100 and 102 substantially evenly over the width of a swath of the field from which the crop has just been harvested by combine 72, which width is typically defined by the overall width of a harvesting head of combine 72, which width can be as much as 30 to 40 feet in the instance of some heads currently in use. Thus, it is desirable that rotary impellers 100 and 102 have the capability to expel or propel crop residue a distance of up to about 20 feet or so therefrom, corresponding to one-half the width of the header used on combine 72, and possibly farther as combine headers of greater width are introduced. Impellers 100 and 102 can be suitably configured and rotated at a sufficient velocity for propelling crop residue such as, but not limited to, chopped straw, stems and branches, cobs and the like, the required distance of up to one-half the width of a header currently being used, by a conventional hydraulic motor or any other suitable driver as mentioned above. The problem to be currently overcome, however, is distributing the crop residue substantially evenly over this distance of up to about 20 feet or so particularly including in the region of a swath directly beneath spreader 96.

To overcome the problem set forth above, spreader 96 includes a pair of adjustable crop residue flow distributors 112, constructed and operable according to the teachings of the present invention. Crop residue flow distributors 112 are mirror images of one another, and thus can be described and discussed singularly when appropriate, and are positioned for use in cooperation with respective impellers 100 and 102 of spreader 96 for receiving and carrying flows of crop residue discharged through discharge opening 110, in opposite sideward directions outwardly away from spreader 96, for distribution in a desired pattern on sides of a just harvested swath of a field over which combine 72 is moving. Here, it should be understood that by the term "sideward" what is meant is a direction transverse the fore and aft directions, the term "sidewardly outwardly" thus meaning sidewardly away from a center line 114 of spreader 96, the term "sidewardly inwardly" meaning closer to center line 114.

Each of flow distributors 112 preferably includes a flow guide of suitable, rigid construction, such as of sheet metal, or plastics, having a first end portion 118 supported adjacent to discharge opening 110 in the vicinity of center line 114 in a position so as to receive at least a portion of the crop residue flow discharged through opening 110. Flow guide 116 includes a second end portion 120 opposite first end portion 118, and a fore edge 122 and an opposite aft edge 124 extending between first and second end portions 118 and 120 defining a crop residue flow surface 126 extending between end portions 118 and 120 for guiding and carrying the received crop residue flow sidewardly outwardly away from spreader 96 and distributing the crop residue, illustrated by strings of oppositely directed arrows C and downwardly directed arrows D in FIG. 4C, for distribution in a pattern on a field, represented by dotted line 128 in FIG. 4C, having desired characteristics, such as uniformity and evenness of crop residue distribution.

Flow guide 116 is additionally preferably elongate in the sideward direction, and crop residue flow surface 126 preferably has an upwardly directed concave shape. Additionally, at least aft edge 124 includes a tapered portion 130 which extends diagonally forwardly and sidewardly outward toward second end portion 120, such that a portion of crop residue flow surface 126 adjacent to second end portion 120 of the flow guide, is reduced in fore and aft extent, compared to a portion of surface 126 adjacent to first end portion 118.

Each of flow guides 116 is preferably supported on combine 72, and more preferably on spreader 96, by adjustable support structure 132. Support structure 132 preferably includes a rear plate 134 mountable in a suitable manner, such as using bolts or other fasteners, to a central region of rear wall 108 of spreader 96, so as to be at least generally aligned with center line 114 of spreader 96. Support structure 132 includes a center flow divider 136 connected to plate 134 and extending forwardly therefrom, so as to be disposed between impellers 100 and 102 for dividing crop residue flow therebetween, and for supporting flow guides 116 for fore and aft movement relative to structure 132, as denoted by arrows E, and also upward and downward pivotal movement relative thereto, as denoted by arrows F. The first end portion 118 of each of flow guides 116 is connected to support structure 132 by a fore and aft extending pivot pin 138 retained in position by a cotter pin 140. Additionally, pins 138 support a center bracket 142 which extends downwardly from divider 136 and is movable in the fore and aft directions with flow guides 116. Each of flow guides 116 includes a bracket 144 on an underside thereof about midway between end portions 118 and 120.

As was previously discussed, this particular combine uses a spreader 96 that includes two impellers 100, 102 to perform the spreading process, along with the flow distributors 116, which are used to aid the impellers in the spreading process. By adjusting the flow guides 116, the residue spreading can be adjusted in order to accommodate different combine header widths or changes due to weather conditions and still perform a quality job of residue distribution. Remotely controlled actuators 146, which can be electric, pneumatic and/or hydraulic, are connected to processor 56 is able to determine the proper adjustment of the flow guides 116 as a function of wind speed and direction. For example, if the wind is blowing from left to right, the flow guides can be adjusted independently of each other in order for the residue being thrown to the left side of the combine can to be thrown farther than the right in order to achieve uniform distribution. Conversely, the right side can be adjusted in order to prevent the residue from being thrown too far relative to the left side. In addition, the speed of each impeller can be adjusted independently in order to compensate for wind speed and direction, i.e. faster the speed, the farther it throws the residue.

Figure 4A:
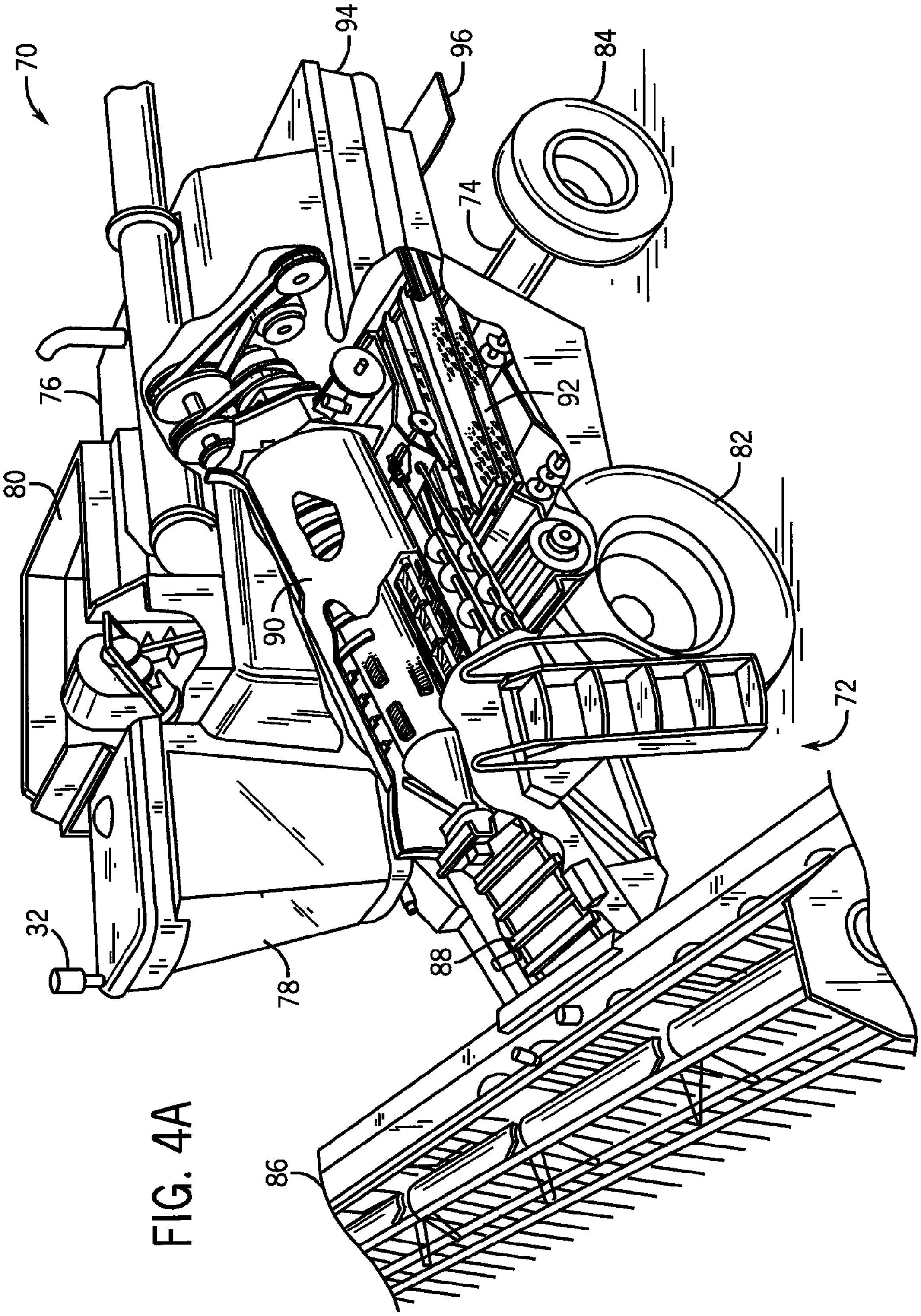
FIG. 4A is a fragmentary, perspective view of another embodiment of an agricultural system according to the present invention, particularly showing an agricultural implement including an agricultural combine.
Figure 4B:
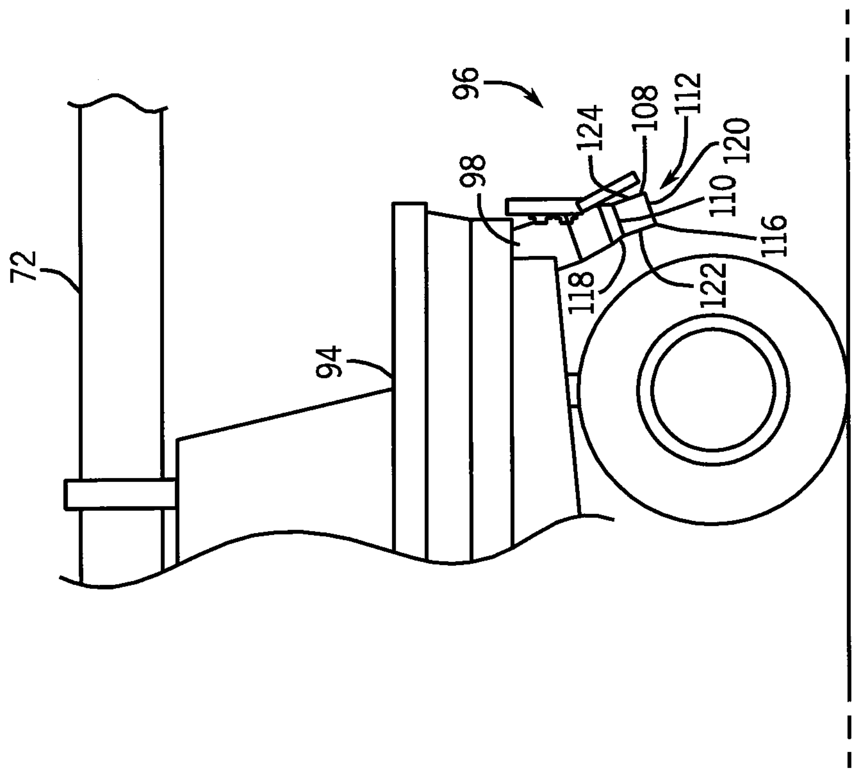
FIG. 4B is a fragmentary, side view of the agricultural combine of FIG. 4A.
Figure 4C:
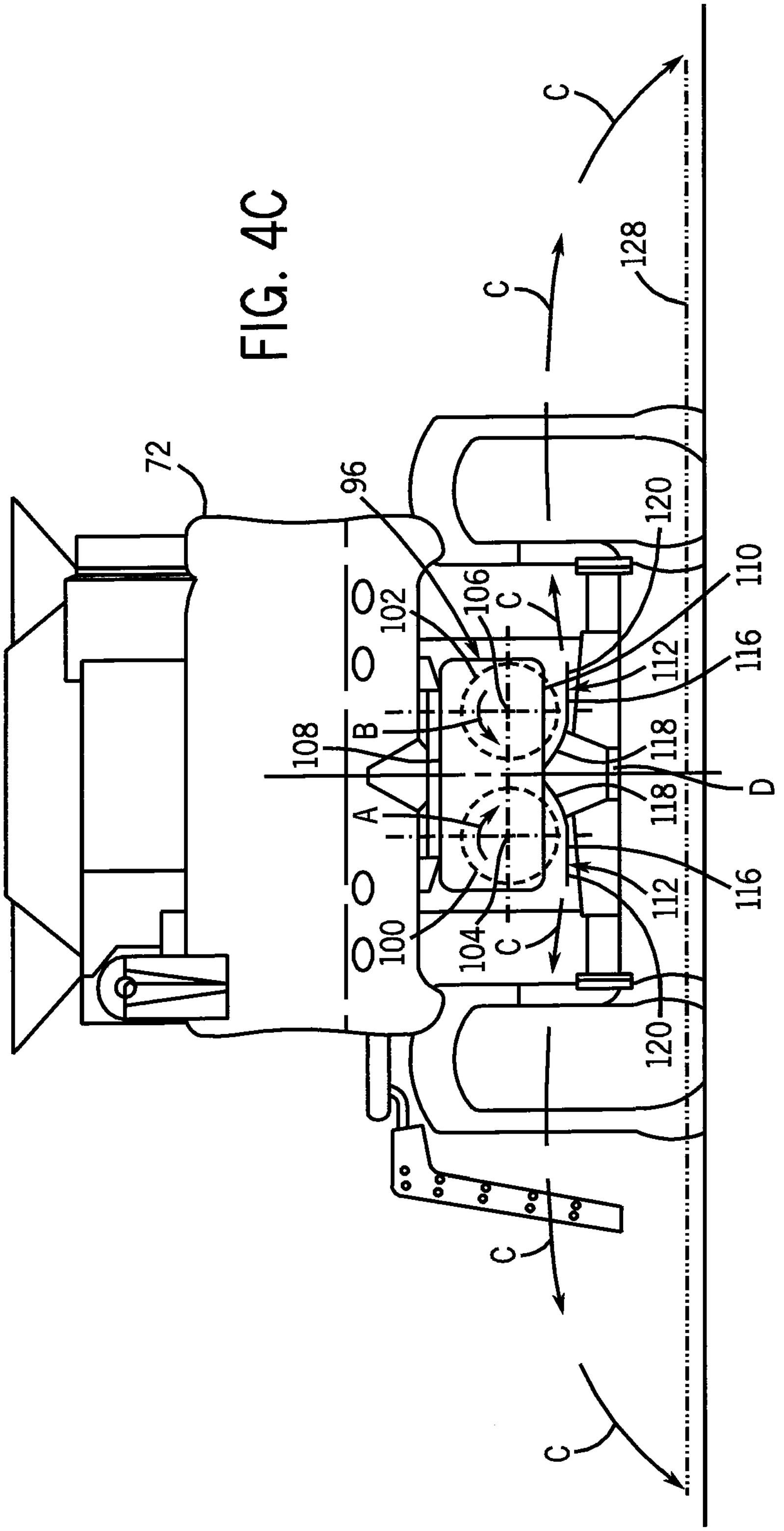
FIG. 4C is an end view of the agricultural combine of FIG. 4A, particularly showing a residue spreader on the rear of the combine.
Figure 4D:
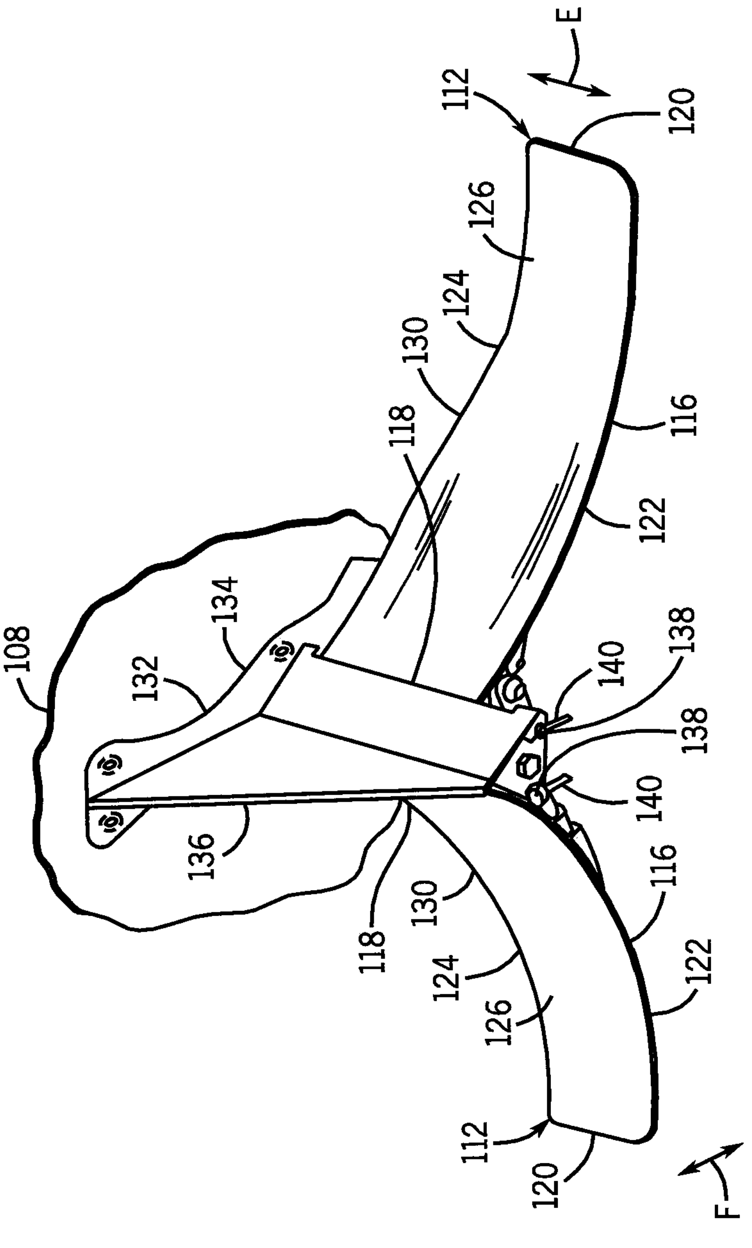
FIG. 4D is a perspective view of the flow guides of the residue spreader of FIG. 4C.
Figure 4E:
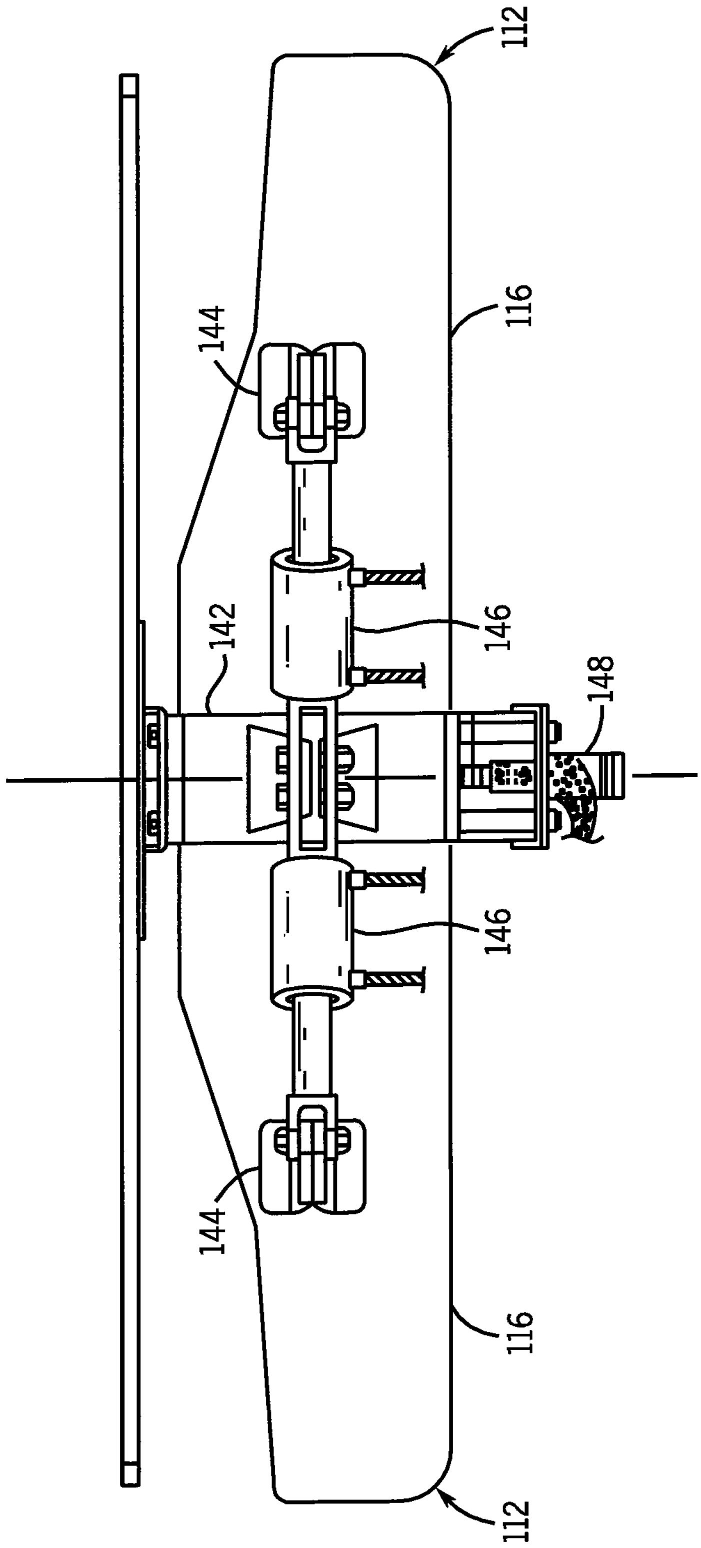
FIG. 4E is a bottom view of the flow guides of the residue spreader of FIG. 4C.

Referring to FIG. 4E, there is an actuator 148, which can also be connected to processor 56, and is controlled automatically in order to achieve optimum residue distribution. Additionally, this embodiment can be used to include optimization based on current and future weather conditions.

This same methodology could be used in machines which use fan type spreaders in order to distribute granulated fertilizers on a field. These machines use impellers to throw the granules to each side of the applicator. The spread width can be adjusted by increasing or decreasing the speed of the impellers, adjusting the height of the impellers, or adjusting the vanes which are typically located on both sides of the impeller in order to negate the effects of a lateral wind.

Figure 5A:
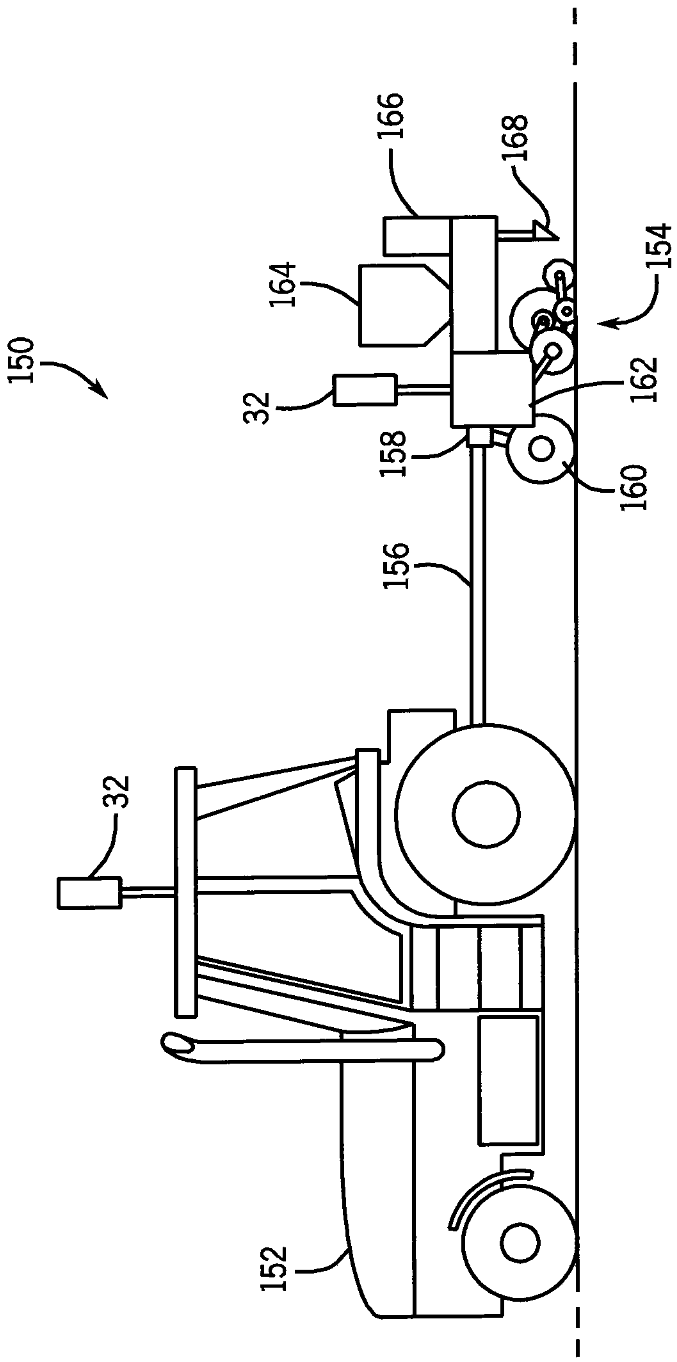
FIG. 5A is a side view of another embodiment of an agricultural system according to the present invention, particularly showing an agricultural implement including an agricultural planter.
Figure 5C:
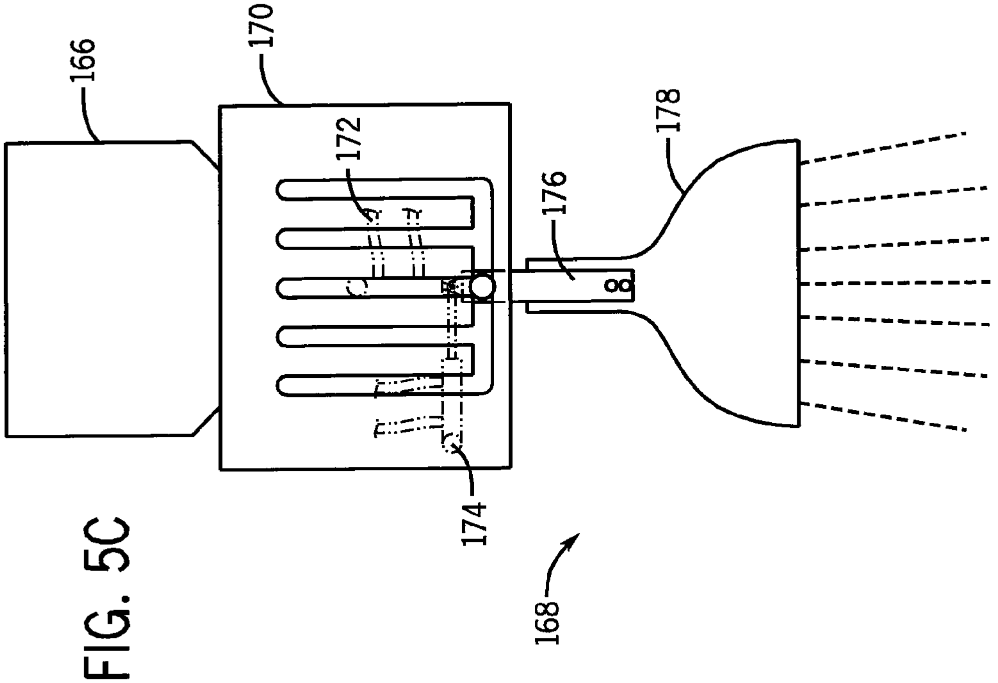
FIG. 5C is a side view of the spreader of FIG. 5B.
Figure 5B:
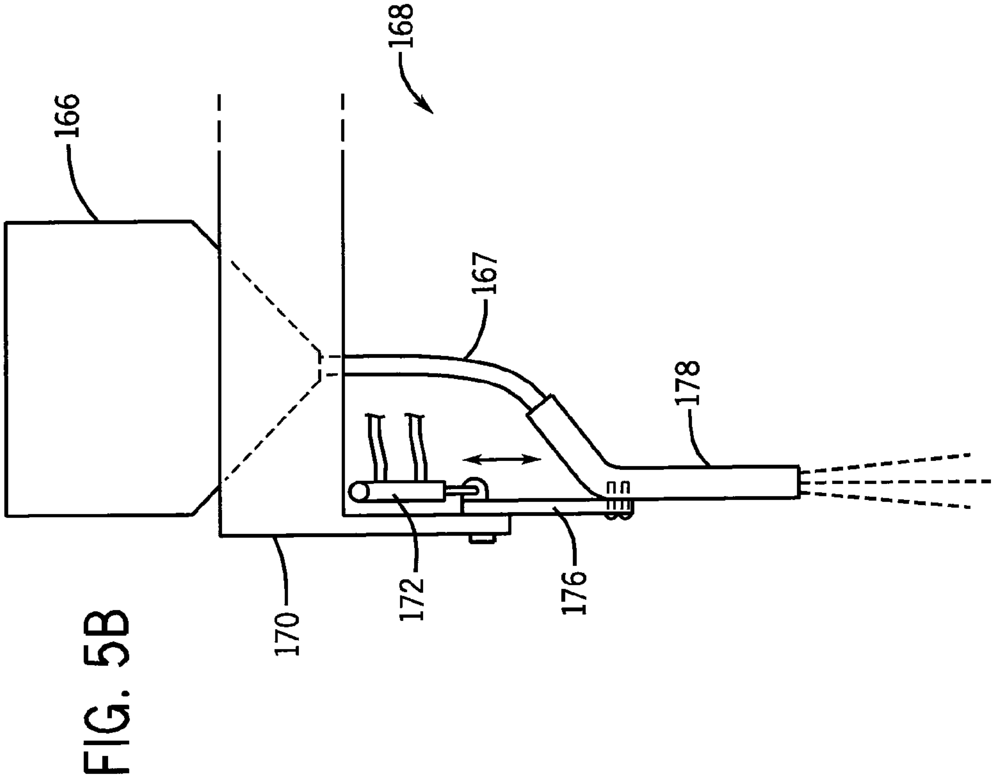
FIG. 5B is an end view of spreader used with the agricultural planter of FIG. 5A.

In FIGS. 5A-5C, and agricultural system 150 includes agricultural implements in the form of a tractor 152 pulling a planter 154 via drawbar 156. Agricultural system 150 includes communication and control system 18, as has been previously described, which can be integrated into tractor 152, planter 154 and/or drawbar 156 via electronic/electrical modules, cabling, flexible printed circuit harnesses, wiring harnesses, connectors, software, firmware, and the like. Mobile weather stations 32 can be connected to agricultural system 150 at a variety of locations as is shown, and other locations, and particularly to communication and control system 18 as described above, and adapted to this planting application which has been integrated into agricultural system 150. Planter 154 can include an elongated tool bar 158 which is supported for movement across and over fields by a plurality of wheels 160 and which is adapted to be towed in a given forward direction by a power source, such as off-highway tractor 152 or some other mobile element. Attached to tool bar 158 is a plurality of application devices in the form of planting units 162 located at spaced intervals along tool bar 158. Seed hoppers 164 are mounted to the planting units 162 and are filled with various seeds which are deposited into the ground. Planting units 162 can also include hoppers 166 for the application of fertilizer, herbicide, pesticide and the like, which are typically granular, but could also be liquid. In this embodiment, the present invention can include optimization of the broadcasting of dry herbicides and pesticide granules. The pesticides are metered from the hopper and delivered to a spreader 168 via a pesticide/herbicide transfer tube 167. Spreader 168 has some of the attributes of the spreader in U.S. Pat. No. 5,133,270, which is incorporated by reference as if fully setforth herein, although spreader 168 has additional attributes as is described below. One of the functions of spreader 168 is to obtain uniform distribution of the granules as they are distributed over the planted row. The even distribution of the granules is quite often hampered by high winds and changing direction. By using the present invention, spreader 168 can be moved closer to the soil profile in order to negate the adverse effect of the wind or could be moved laterally to counteract the wind blowing from one side or the other.

Referring more specifically to FIGS. 5B and 5C, planter 154 includes hopper support frame 170 which supports hopper 166. Actuators 172, 174, which are connected to processor 56, can move spreader support 176, and spreader head 178, vertically or laterally relative to hopper support frame 170, as a function of wind speed and/or wind direction determined by mobile weather station 32.

In other embodiments the present invention can be used to automatically control environmental controls inside the operator cab of a tractor, combine or other agricultural implement; i.e., automatic louvers, shades, glass tintings, A/C or heat controls, etc.

The present invention provides optimization of the agricultural application using collected information. Crop inputs and the application can be optimized during their application based on current weather conditions and/or other parameters. Application product data and environmental information can be used in real time to adjust parameters or inputs of the agricultural application operation. The present invention can help an operator avoid potential liabilities, caused by misapplication of a crop input to an adjacent property, by adjusting or aborting an operation to avoid the misapplication. The present invention simultaneously logs (records) and adjusts an agricultural operation in real time.

While example embodiments and applications of the present invention have been illustrated and described, including a preferred embodiment, the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. An agricultural system, comprising:

at least one agricultural implement having at least one application device for applying crop inputs, the at least one agricultural implement including at least one of an agricultural harvester and an agricultural planter;

a databus connected to the at least one agricultural implement;

at least one input device connected to the databus, the at least one input device receiving data during active application of crop inputs;

at least one data storage device connected to the databus;

an application controller connected to the at least one application device, said application controller is connected to at least one nozzle;

a processor connected to the databus and the application controller, the processor configured to apply inputs to the application controller to make real-time adjustments to an active application operation of the at least one nozzle to vary the application of the crop inputs in response to the data; and an agricultural spreader for applying the crop inputs, the at least one input device includes a mobile weather station connected to said agricultural implement, wherein the mobile weather station provides at least a wind speed information and a wind direction information near the agricultural spreader, the wind speed information and the wind direction information being provided to the databus;

wherein the wind speed information and the wind direction information are used by the application controller to automatically adjust an application rate of the crop inputs, to move the agricultural spreader laterally relative to the agricultural implement in a generally horizontal direction generally normal to a direction of movement of the agricultural implement, and to control a height of the agricultural spreader above a soil surface.

2. The agricultural system of claim 1, wherein the mobile weather station provides at least a temperature information and a humidity information near the agricultural spreader, the temperature information and the humidity information being provided to the databus.

3. The agricultural system of claim 1, wherein the at least one agricultural implement is a combine, and the agricultural spreader includes at least one crop residue flow distributor.

4. The agricultural system of claim 1, wherein the at least one agricultural implement is a planter, and the agricultural spreader includes spreader head.

5. The agricultural system of claim 1, wherein the at least one data storage device includes at least one of field characteristics information, chemical product data, and logged data being provided to the databus, the processor using at least one of the field characteristics information, the chemical product data, and the logged data, in combination with the wind speed information and the wind direction information to plan a path for an operation of the agricultural spreader that is tailored to at least one of ground contours and weather conditions to reduce uneven application of a product by the agricultural spreader.

6. The agricultural system of claim 5, wherein the path planning allows the agricultural spreader to apply a crop input to a field in a specific direction.

7. The agricultural system of claim 1, wherein the at least one input device includes a wireless communication device providing weather forecast data to the databus and a user interface, the processor providing instructions to the user interface for an operator of the agricultural system based on the weather forecast data.

8. The agricultural system of claim 7, wherein if the weather forecast data indicates at least one of an increasing wind condition and a changing wind direction, the processor provides instructions to the user interface for an operator to one of spray sensitive field areas first and wait until a favorable wind shift.

9. The agricultural system of claim 1, wherein the input device comprises at least one of a user interface, an application settings device, a vehicle location sensor, and a wireless communication device.

10. The agricultural system of claim 1, wherein the crop inputs include at least one of a fertilizer, a herbicide, a pesticide, and a crop residue.

11. The agricultural system of claim 1, wherein the mobile weather station is packaged in a single unit with at least one of a wind speed sensor, a wind direction sensor, a temperature sensor and a humidity sensor, the mobile weather station being transportably connected to the at least one agricultural implement so that it can be moved to another of the at least one agricultural implement.

12. The agricultural system of claim 1, wherein the mobile weather station includes at least one of a wind speed sensor, a wind direction sensor, a temperature sensor and a humidity sensor, the mobile weather station producing at least one of the wind speed data, the wind direction data, a temperature data and a humidity data, where all data is shared on the databus; whereby the processor is enabled to adjust for at least one of threshing and harvesting of at least one of grain, fiber, hay and forage products.

13. The agricultural system of claim 1, wherein the mobile weather station produces at least one of a temperature data and a humidity data, where any of the data is used by the processor to automatically control the at least one application device to provide a desired residue spreading quality in a harvesting operation.

14. The agricultural system of claim 1, wherein the wind speed information and the wind direction information are used by the application controller to optimally adjust the flow rate of the crop inputs together with the height of the agricultural spreader above the soil surface.

15. A method of operating an agricultural system, comprising the steps of:

providing at least one agricultural implement which includes an agricultural spreader for applying a crop input, a databus connected to the at least one agricultural implement, at least one input device connected to the databus, at least one data storage device connected to the databus, an application controller connected to the at least one application device, said application controller is connected to at least one nozzle; and a processor connected to the databus and the application controller, the processor for applying inputs to the application controller;

entering boundaries for a field and other sensitive areas based on one of an operator input and a stored database in the at least one data storage device;

entering the spray crop input on one of an operator input and a stored database;

obtaining current weather conditions from a mobile weather station;

calculating a time required to apply the crop input to the field;

determining whether the weather conditions allow for the application of the crop input within the time required to apply the crop input on the field;

moving the agricultural spreader laterally relative to a support frame of the agricultural implement in a generally horizontal direction generally normal to a direction of movement of the agricultural implement dependent upon at least one of a wind speed and a wind direction obtained in said obtaining step; and applying the crop input using the agricultural spreader dependent upon the determining step.

16. The method of claim 15, wherein the determining step includes the substep of considering a weather forecasted data provided from one of a wireless communication device and an operator input.

17. The method of claim 15, further including the step of calculating a travel plan with the processor for the agricultural implement.

18. The method of claim 17, further including the step of adjusting the agricultural spreader with the application controller to at least one of adjust for a current operation of the agricultural spreader; whereby the crop input is applied.

19. The method of claim 17, wherein the calculating a travel plan step includes the substep of calculating a location to begin spreading of the crop input.

20. The method of claim 15, further including the steps of operating the agricultural spreader to apply the crop input, and monitoring the current weather conditions until a field application is complete, the monitoring step occurring concurrently with the operating step.

* * * * *